United States Patent
Lee et al.

(10) Patent No.: US 11,259,550 B2
(45) Date of Patent: Mar. 1, 2022

(54) METHOD FOR PREPARING FERMENTED SOYBEAN PASTE AND FERMENTED SOYBEAN PASTE PREPARED THEREBY

(71) Applicant: CJ Cheiljedang Corporation, Seoul (KR)

(72) Inventors: Seung Yeon Lee, Seoul (KR); Duk Jin Kim, Gyeonggi-do (KR); Hye Won Shin, Seoul (KR)

(73) Assignee: CJ CHEILJEDANG CORPORATION

( * ) Notice: Subject to any disclaimer, the term of this patent is extended or adjusted under 35 U.S.C. 154(b) by 65 days.

(21) Appl. No.: 15/756,077

(22) PCT Filed: Aug. 30, 2016

(86) PCT No.: PCT/KR2016/009658
§ 371 (c)(1),
(2) Date: Feb. 28, 2018

(87) PCT Pub. No.: WO2017/039285
PCT Pub. Date: Mar. 9, 2017

(65) Prior Publication Data
US 2018/0310598 A1 Nov. 1, 2018

(30) Foreign Application Priority Data
Aug. 31, 2015 (KR) .......................... 10-2015-0123021

(51) Int. Cl.
*A23L 11/10* (2016.01)
*A23L 11/50* (2021.01)
(Continued)

(52) U.S. Cl.
CPC .............. *A23L 11/50* (2021.01); *A23L 11/07* (2016.08); *A23L 11/10* (2016.08); *A23L 11/70* (2021.01);
(Continued)

(58) Field of Classification Search
None
See application file for complete search history.

(56) References Cited

U.S. PATENT DOCUMENTS

2005/0220937 A1 10/2005 Ito et al.
2009/0053363 A1* 2/2009 An .......................... A23L 11/09
426/46

FOREIGN PATENT DOCUMENTS

| CN | 101283772 A | 10/2008 |
| CN | 101438811 A | 5/2009 |

(Continued)

OTHER PUBLICATIONS

Kim et al. (KR 10-1056546) 2011 (Year: 2011).*
(Continued)

*Primary Examiner* — Felicia C Turner
(74) *Attorney, Agent, or Firm* — Adsero IP

(57) ABSTRACT

The present disclosure provides a method for preparing a fermented soybean paste and a fermented soybean paste prepared thereby, the method comprising: a mixing step for mixing a Traditional Korean fermented soybean paste and a modified Korean fermented soybean paste to prepare a mixed fermented soybean paste; a first aging step for primarily aging the mixed fermented soybean paste at room temperature; and a second aging step for secondarily aging mixed fermented soybean paste, which has gone through the primary aging at low temperature. According to the method for preparing a fermented soybean paste and a fermented soybean paste prepared thereby, of the present disclosure, a distinctive deep and pleasant flavor of the Traditional Korean fermented soybean paste due to the combinative fermentation is maintained by mixing the traditional Korean fermented soybean paste and the modified Korean fermented soybean paste, and the protein degradation rate is increased using the high protease activity of the modified fermented (Continued)

soybean paste, thereby shortening the aging time and increasing the savory taste. In addition, according to the method for preparing a fermented soybean paste of the present disclosure, the mixed fermented soybean paste having gone through primary aging is secondarily aged at a low temperature, thereby preventing browning during the process, so that a fermented soybean paste with high preference can be produced, and the preparation time is relatively short while a pleasant flavor of the Traditional Korean fermented soybean paste is maintained, so that a fermented soybean paste with excellent quality can be mass-produced.

6 Claims, 1 Drawing Sheet

(51) Int. Cl.
*A23L 11/00* (2021.01)
*A23L 11/70* (2021.01)
*A23L 27/50* (2016.01)

(52) U.S. Cl.
CPC ........... *A23L 27/50* (2016.08); *A23V 2002/00* (2013.01); *A23V 2300/38* (2013.01)

(56) References Cited

FOREIGN PATENT DOCUMENTS

| | | | |
|---|---|---|---|
| CN | 101810314 | A | 8/2010 |
| CN | 103719822 | A | 4/2014 |
| JP | H104909 | A | 1/1998 |
| JP | 2009-528822 | A | 8/2009 |
| JP | 2015-524277 | A | 8/2014 |
| KR | 10-2001-0111432 | A | 12/2001 |
| KR | 20040080634 | A | 9/2004 |
| KR | 10-0497656 | B | 7/2005 |
| KR | 10-0917004 | B1 | 9/2009 |
| KR | 10-2011-0062398 | A | 6/2011 |
| KR | 10-1056546 | B1 | 8/2011 |
| KR | 2012-0015235 | A | 2/2012 |
| KR | 10-2014-0055617 | A | 5/2014 |
| KR | 2014-0055617 | A | 5/2014 |
| KR | 2015-0039360 | A | 4/2015 |
| KR | 10-1541758 | B | 8/2015 |

OTHER PUBLICATIONS

Lee KR 2006010593 Derwent Abstract 2005 (Year: 2005).*
Ryu et al. (KR 1020150039360). (Year: 2015).*
Lee et al. KR20130065956 Derwent Abstract 2013 p. 1 (Year: 2013).*
"Fermented Food For Enhancing Immunity, Effective for Prevention of New Type of Flu" Published on Aug. 25, 2009 in Kukminilbo by Cho, Kyu-Bong accessible at http://news.naver.com/main/tool/print.nhn?oid=005&aid=0000375064 Jan. 3, 2017 2.
"Science of Meju and Soybean Soup", Chung, Dong-Hyo published May 5, 2012 by Yuhan Munhwasa.
European Search Report on patentability from PCI/KR2016/009658 dated Feb. 15, 2019.
International Search Report dated Nov. 29, 2016 in PCT/KR2016/009658.

* cited by examiner

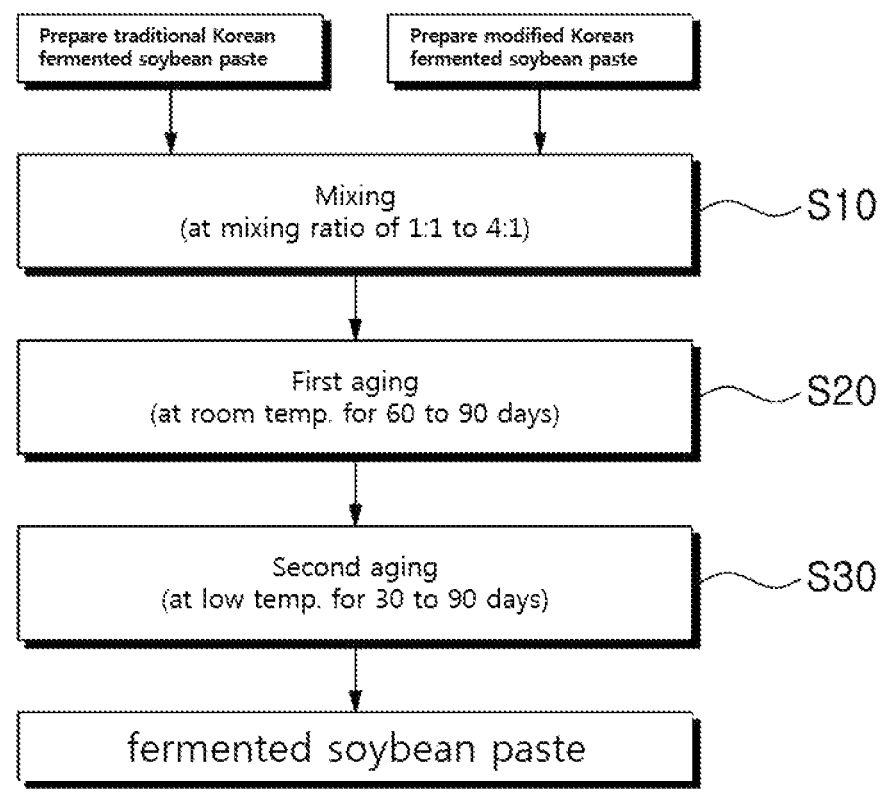

METHOD FOR PREPARING FERMENTED SOYBEAN PASTE AND FERMENTED SOYBEAN PASTE PREPARED THEREBY

RELATED APPLICATIONS

This application is a National Stage Entry of International Application No. PCT/KR2016/009658, filed on Aug. 30, 2016 and claims the benefit of Korean Application No. 10-2015-0123021, filed on Aug. 31, 2015, each of which is incorporated herein by reference in its entirety for all purposes as if fully set forth herein

TECHNICAL FIELD

The present disclosure relates to a method for preparing a fermented soybean paste and a fermented soybean paste prepared by the preparation method. More specifically, the present disclosure relates to a method for preparing a fermented soybean paste and a fermented soybean paste prepared by the preparation method, which method includes mixing a traditional Korean fermented soybean paste and a modified Korean fermented soybean paste to prepare a mixed fermented soybean paste and conducting a first aging at room temperature and then a second aging at low temperature, so it maintains a deep savory taste peculiar to the Korean fermented soybean paste, uses the high enzymatic activities of protease in the modified Korean fermented soybean paste to raise the proteolysis rate, shorten the aging time and enhance a savory called "umami", and prevents browning during the process by conducting the second aging at low temperature, thereby producing a fermented soybean paste with high acceptability.

BACKGROUND ART

Depending on the preparation method, the fermented soybean paste products are classified into a traditional Korean fermented soybean paste and a modified fermented soybean paste. The preparation method makes a significant difference in taste and flavor. The traditional Korean fermented soybean paste is a fermented soybean paste called "doenjang" prepared by a traditional method that has long been adopted as a domestic preparation method for fermented soybean paste in Korea. In the traditional preparation method for doenjang, soy sauce is infused from the soaked meju bricks, and the remaining meju chunks are mashed and aged with additional salt in another crock. Through the active proteolysis, the meju chunks tend to give off lots of ammonia and a strong pungent smell. On the contrary, the modified Korean fermented soybean paste, first invented in Japan, is prepared by implanting microorganisms capable of breaking down proteins and starch into a starch material like rice or barley to prepare Kokja (i.e., Korean Koji), mixing the Kokja with boiled soybeans and salt, aging the mixture, and grinding the aged mixture.

More specifically, traditional Korean fermented soybean paste is prepared by making meju from crushed soybeans, shaping it into rectangular blocks or balls, naturally fermenting the meju blocks or balls, soaking the fermented meju in brine for 6 to 12 months of aging, separating soy sauce from the solid portion, and aging the remaining solid portion. Generally, it takes one or two years to complete a traditional Korean fermented soybean paste in this method; hence, the traditional Korean fermented soybean paste is not adequate to produce in large quantities.

During the preparation of the traditional Korean fermented soybean paste, such a prolonged aging process conducted at room temperature may incur browning on the surface of the fermented soybean paste and create stale taste and unpleasant smell in the brown portions of the fermented soybean paste to deteriorate the whole taste qualities of the fermented soybean paste.

In the preparation method of a modified Korean fermented soybean paste for imposing the flavor of the traditional Korean fermented soybean paste, it is general to inoculate two or three strains of microorganisms for multiple-step or step-by-step aging. Such a method is, however, hard to use due to its complicated production process and inadequate in the aspect of food stability with the use of strains in the aging process, many of which are not registered in the ingredient database of the Korean Food & Drug Administration (http://fse.foodnara.go.kr/origin/dbincex.jsp).

PRIOR TECHNICAL DOCUMENTATIONS (Patent Reference 1) KR 10-2014-0055617 (laid-open on May 9, 2014)

DISCLOSURE OF DISCLOSURE

For solving the above-described problems with the prior art, it is an object of the present disclosure to provide a method for preparing a fermented soybean paste that maintains a deep savory taste peculiar to the traditional Korean fermented soybean paste and uses the high enzymatic activities of protease in the modified Korean fermented soybean paste to raise the proteolysis rate, shorten the aging time, and prevent browning, thereby producing a fermented soybean paste with high acceptability.

It is another object of the present disclosure to provide a fermented soybean paste prepared by the preparation method for fermented soybean paste.

To achieve the objects of the present disclosure, there is provided a method for preparing a fermented soybean paste that includes: mixing a Traditional Korean fermented soybean paste and a modified Korean fermented soybean paste to prepare a mixed fermented soybean paste; conducting a first aging for the mixed fermented soybean paste at room temperature; and conducting a second aging for the mixed fermented soybean paste at low temperature after completion of the first aging.

There is also provided a fermented soybean paste prepared by the preparation method for fermented soybean paste.

Effects of the Disclosure

The method for preparing a fermented soybean paste and the fermented soybean paste prepared by the preparation method according to the present disclosure involve mixing a traditional Korean fermented soybean paste and a modified Korean fermented soybean paste to maintain a deep savory taste due to the multiple-step fermentation as characteristic to the traditional Korean fermented soybean paste and to use the high enzymatic activities of protease in the modified fermented soybean paste, raising the proteolysis rate, shortening the aging time and increasing a savory called "umami".

In addition, the method for preparing a fermented soybean paste according to the present disclosure involves a second aging for the mixed fermented soybean paste at low temperature after completion of the first aging, to prevent browning during the process and produce a fermented soybean paste with high acceptability. Further, it allows the production of a fermented soybean paste with high quality in large quantities by realizing a relatively short production time while maintaining a savory taste peculiar to the Korean fermented soybean paste.

BRIEF DESCRIPTIONS OF DRAWINGS

FIG. 1 is a flow chart showing the process of the preparation method for fermented soybean paste according to the present disclosure.

BEST MODES FOR CARRYING OUT THE DISCLOSURE

Hereinafter, the present disclosure will be described in detail with reference to the accompanying drawing.

FIG. 1 is a flow chart showing the process of the preparation method for fermented soybean paste according to the present disclosure. The method for preparing a fermented soybean paste includes: a mixing step S10 for mixing a traditional Korean fermented soybean paste and a modified Korean fermented soybean paste to prepare a mixed fermented soybean paste; a first aging step S20 for conducting a first aging for the mixed fermented soybean paste at room temperature; and a second aging step S30 for conducting a second aging for the mixed fermented soybean paste at low temperature after completion of the first aging.

In the present disclosure, the mixing step S10 includes mixing a traditional Korean fermented soybean paste and a modified Korean fermented soybean paste to prepare a mixed fermented soybean paste. In the first mixing step S10, the mixing method may be any one of the mixing methods known to those skilled in the art, specifically using a mixing machine to mix the traditional Korean fermented soybean paste and the modified Korean fermented soybean paste well together. Through the mixing step, it is possible to provide a method for preparing a fermented soybean paste that maintains a deep savory taste peculiar to the traditional Korean fermented soybean paste and uses the high enzymatic activities of protease in the modified Korean fermented soybean paste to raise the proteolysis rate, shorten the aging time, and prevent browning, thereby producing a fermented soybean paste with high acceptability.

The traditional Korean fermented soybean paste of the present disclosure may include a Korean-style meju, which is prepared by steaming and cooling down soybeans, shaping the soybeans into rectangular blocks with or without a fermentation starter, Aspergillus oryzae, added in an amount of 0.1 to 1.0 wt. % with respect to the weight of grains, and fermenting the blocks of soybeans. The Korean-style meju thus obtained is soaked in brine, aged for 6 to 12 months, and removed of soy sauce. The remaining solid portion of meju is crushed, mixed with more salts, and then aged in another crock. The preparation method of the traditional Korean fermented soybean paste is not limited to those procedures stated above.

The modified Korean fermented soybean paste of the present disclosure may include a modified meju, which is prepared by steaming and cooling down soybeans, adding a fermentation starter, in an amount of 0.1 to 2.0 wt. %, and conducting fermentation, and the fermented soybeans keep their small ball shape. The modified meju may further be prepared by mixing steamed soybeans with salt, aging the steamed soybeans, and crushing the aged soybeans, after the fermentation step. The preparation method of the modified Korean fermented soybean paste is not limited to those procedures stated above.

The fermentation starter used in the preparation of the modified Korean fermented soybean paste may be *Aspergillus oryzae*. The conventional modified Korean fermented soybean paste developed to impose the flavor of the traditional Korean fermented soybean paste is generally prepared by inoculating two or three strains of microorganisms for multiple-step or step-by-step aging. Such a method is hard to use due to its complicated process and inadequate in the aspect of food stability with the use of strains in the aging process, many of which are not registered in the ingredient database of the Korean Food & Drug Administration (http://fse.foodnara.go.kr/origin/dbindex.jsp). In contrast, the present disclosure uses a common fermentation starter, *Aspergillus oryzae*, in the preparation of a modified fermented soybean paste. This is more preferable in the aspect of food stability.

In the present disclosure, the traditional Korean fermented soybean paste and the modified Korean fermented soybean paste may be mixed at a mixing ratio of 0.8:1 to 4:1, specifically 1:1 to 3:1, more specifically 2:1. When the mixing ratio of the traditional Korean fermented soybean paste to the modified Korean fermented soybean paste is out of the range of 0.8:1 to 4:1, it may eliminate a savory taste unique to the traditional Korean fermented soybean paste and reduce the enzymatic activities of protease to decrease the proteolysis and prolong the aging time.

The first aging step S20 includes conducting a first aging process for the mixed fermented soybean paste prepared from the Traditional Korean fermented soybean paste and the modified Korean fermented soybean paste at room temperature. The first aging step S20 may involve an aging process conducted by a method widely known to those skilled in the art, preferably a constant-temperature aging method. With the first aging step, it is possible to achieve a further fermentation for the mixed fermented soybean paste of the Traditional Korean fermented soybean paste and the modified fermented soybean paste, which are fermented.

In the first aging step of the present disclosure, the mixed fermented soybean paste may be subjected to a first aging at 20 to 30° C. for 30 to 100 days, more specifically at 25° C. for 60 to 90 days. When the aging temperature for the mixed fermented soybean paste is out of the defined temperature range, it may retard the aging process or cause no occurrence of aging. When the aging period is out of the defined period range, it may cause no occurrence of optimal aging or incur browning on the surface of the meju or an abnormal fermentation to create stale taste and unpleasant smell, so it may not be adequate to produce the fermented soybean paste in large quantities due to a long-term aging.

The second aging step S30 includes conducting a second aging for the mixed fermented soybean paste at low temperature after completion of the first aging. The second aging step S30 may involve an aging process conducted by a method widely known to those skilled in the art, preferably an aging process in a cold storage chamber. With the second aging step, it is possible to achieve a further fermentation for the mixed fermented soybean paste of the first aging step and to prevent browning on the surface of the mixed fermented soybean paste, avoiding occurrence of stale taste and unpleasant smell, thereby providing a fermented soybean paste excellent in the aspect of outer appearance and flavor.

In the second aging step of the present disclosure, the mixed fermented soybean paste after the first aging step may be subjected to a second aging at a lower temperature than the aging temperature of the first aging step for 60 to 180 days, preferably 10 to 15° C. for 60 to 100 days. When the mixed fermented soybean paste is aged at the same temperature of the first aging step or above, it may cause browning or abnormal fermentation on the surface of the mixed fermented soybean paste to create stale taste and unpleasant smell and deteriorate the flavor of the fermented soybean paste. When the aging period of the second aging step is out of the range of 60 to 180 days, it may cause no occurrence of optimal aging or may not be adequate to produce the fermented soybean paste in large quantities due to a long-term aging.

In addition, the present disclosure may provide a fermented soybean paste produced by the preparation method. The fermented soybean paste prepared by the preparation method of the present disclosure uses a mixture of the Traditional Korean fermented soybean paste and the modified fermented soybean paste, so the present disclosure can maintain a deep savory taste peculiar to the Traditional Korean fermented soybean paste and use the high enzymatic activities of protease in the modified Korean fermented soybean paste to raise the proteolysis rate and shorten the aging time, making it adequate to achieve the production of the fermented soybean paste in large quantities. Further, the second aging for the mixed fermented soybean paste conducted at low temperature after completion of the first aging can prevent browning during the process and provide a fermented soybean paste with high taste qualities and high acceptability.

Hereinafter, the present disclosure will be described in detail with reference to the following examples, which are given for the illustrations of the present disclosure only and not construed to limit the scope of the present disclosure.

EXAMPLES

<Preparation of Traditional Korean Fermented Soybean Paste and Modified Fermented Soybean Paste>

The preparation procedures for a Traditional Korean fermented soybean paste were performed as follows.

Selected soybeans were washed, steamed and cooled down to 20 to 50° C. The cooled soybeans were crushed and shaped into a rectangular block to prepare a Korean-style meju. Then, a fermentation starter, *Aspergillus oryzae*, available by a known method was added in an amount of 0.1 to 1.0 wt. % with respect to the weight of grains. The soybeans as used herein may include at least one selected from the group consisting of soybean, subaktae, yutae, jinjoori, cheongtae, black bean, huktae, seoritae, yellow bean, kidney bean, dongbu, pea, horse bean, broad bean, and black soybean. The Korean-style meju was fermented at 10 to 40° C. for 1 to 3 months, soaked in brine having a salinity of 18 to 25% and a weight 1.8 to 2.5 times the weight of the meju for 10 to 50 days, and then separated from the brine to produce a Korean fermented soybean paste.

The preparation procedures for a modified Korean fermented soybean paste were performed as follows.

Selected soybeans were washed, steamed and cooled down to 20 to 50° C. The cooled soybeans were made into a modified meju formed in the shape of small balls. Then, a fermentation starter, *Aspergillus oryzae*, available by a known method was added in an amount of 0.1 to 1.0 wt. % respect to the weight of grains. The soybeans as used herein may include at least one selected from the group consisting of soybean, subaktae, yutae, jinjoori, cheongtae, black bean, huktae, seoritae, yellow bean, kidney bean, dongbu, pea, horse bean, broad bean, and black soybean. The modified meju was fermented at 20 to 40° C. for 2 to 7 days and mixed with salt to have a salinity of 8 to 12%. Then, water was added to make a moisture content of 48 to 58%, thereby producing a modified fermented soybean paste.

<Preparation of Mixed Fermented Soybean Paste>

The Traditional Korean fermented soybean paste and the modified Korean fermented soybean paste prepared in the above-described manner were mixed together at a mixing ratio of 1:1, 2:1, or 3:1 to prepare a mixed fermented soybean paste.

<First Aging of Mixed Fermented Soybean Paste>

The mixed fermented soybean paste was aged at room temperature for 90 days. Example 1 was the mixed fermented soybean paste prepared by mixing the traditional Korean fermented soybean paste and the modified Korean fermented soybean paste at a mixing ratio of 1:1 and then conducting a first aging at 25° C. Example 2 was the mixed fermented soybean paste prepared by mixing the traditional Korean fermented soybean paste and the modified Korean fermented soybean paste at a mixing ratio of 2:1 and then conducting a first aging at 25° C. Example 3 was the mixed fermented soybean paste prepared by mixing the traditional Korean fermented soybean paste and the modified Korean fermented soybean paste at a mixing ratio of 3:1 and then conducting a first aging at 25° C. Example 4 was the mixed fermented soybean paste prepared by mixing the traditional Korean fermented soybean paste and the modified Korean fermented soybean paste at a mixing ratio of 2:1 and then conducting a first aging at 20° C.

Comparative Example 1 was the traditional Korean fermented soybean paste aged at 25° C. Comparative Example 2 was the modified Korean fermented soybean paste aged at 25° C. Comparative Example 3 was the mixed fermented soybean paste prepared by mixing the Comparative Examples 1 and 2 at a mixing ratio of 1:1. Comparative Example 4 was the mixed fermented soybean paste prepared by mixing the Comparative Examples 1 and 2 at a mixing ratio of 2:1. Comparative Example 5 was the mixed fermented soybean paste prepared by mixing the Comparative Examples 1 and 2 at a mixing ratio of 3:1.

Experimental Example 1: Amino Nitrogen Content and pH of Mixed Fermented Soybean Pastes of the Present Disclosure (Examples 1 to 4) and Comparative Examples 1 to 5

Examples 1 to 4 subjected to the first aging according to the present disclosure and Comparative Examples 1 to 5 were measured in regards to amino nitrogen content (proteolysis rate) and pH value. The amino nitrogen content is an indicator showing the savory taste of the soybean paste during the aging process, and the pH value is an index of abnormal fermentation and sourness. The measurements are presented in Table 1. Generally, a fermented soybean paste is considered to have a higher quality when it displays a higher amino nitrogen content and a higher pH value.

TABLE 1

| Div. | | Mixing ratio (Korean-style to modified) | Aging Temp. (° C.) | Amino nitrogen content (mg %) | pH |
|---|---|---|---|---|---|
| Comparative Example | 1 | Traditional Korean fermented soybean paste after first aging | 25° C. | 357 | 4.79 |

TABLE 1-continued

| Div. | | Mixing ratio (Korean-style to modified) | Aging Temp. (° C.) | Amino nitrogen content (mg %) | pH |
|---|---|---|---|---|---|
| | 2 | Modified Korean fermented soybean paste after first aging | | 691 | 5.05 |
| | 3 | Mixed fermented soybean paste of Comparative Examples 1 and 2 (1:1) | | 524 | — |
| | 4 | Mixed fermented soybean paste of Comparative Examples 1 and 2 (2:1) | | 468 | — |
| | 5 | Mixed fermented soybean paste of Comparative Examples 1 and 2 (3:1) | | 441 | — |
| Example | 1 | Mixing at 1:1 and first aging | 25° C. | 710 | 4.84 |
| | 2 | Mixing at 2:1 and first aging | | 689 | 5.03 |
| | 3 | Mixing at 3:1 and first aging | | 663 | 5.05 |
| | 4 | Mixing at 2:1 and first aging | 20° C. | 608 | 4.98 |

In regards to the amino nitrogen content, the mixed fermented soybean paste of Example 2 according to the present disclosure was about twice as high as the traditional Korean fermented soybean paste of Comparative Example 1, equivalent to the modified Korean fermented soybean paste of Comparative Example 2, and 147% higher than the mixed fermented soybean paste of Comparative Example 4, where Example 2 and Comparative Examples 1 and 2 were subjected to a first aging step at the same temperature of 25° C. As for the pH value, the mixed fermented soybean paste of Example 2 was equal to the modified Korean fermented soybean paste of Comparative Example 2 and higher than the traditional Korean fermented soybean paste of Comparative Example 1 by 0.2 or above. In terms of the amino nitrogen content, the mixed fermented soybean paste of Example 4 aged at 20° C. was 129% higher than the mixed fermented soybean paste of Comparative Example 4.

The mixed fermented soybean paste of Example 1 was higher in the amino nitrogen content than the traditional Korean fermented soybean paste of Comparative Example 1 and the modified Korean fermented soybean paste of Comparative Example 2 as well and 135% higher than the mixed fermented soybean paste of Comparative Example 3. Concerning the pH value, the mixed fermented soybean paste of Example 1 was lower than the modified Korean fermented soybean paste of Comparative Example 2 and higher than the traditional Korean fermented soybean paste of Comparative Example 1.

As a result, in terms of the proteolysis rate and quality of the soybean paste, the mixed fermented soybean paste of the traditional Korean fermented soybean paste and the modified Korean fermented soybean paste aged after the mixing is more favorable than the traditional Korean fermented soybean paste and the modified Korean fermented soybean paste separately aged and then mixed together.

<Second Aging of Mixed Fermented Soybean Paste>

The mixed fermented soybean paste after completion of the first aging in Example 2 was aged at low temperature of 10 to ° C. for 60 days to prepare a fermented soybean paste of Example 5.

Further, the mixed fermented soybean paste after completion of the first aging in Example 2 was aged under the same conditions of the first aging (25° C.) for 60 days to prepare a fermented soybean paste of Comparative Example 6.

Experimental Example 2: Amino Nitrogen Content, pH, and Lightness of Fermented Soybean Paste of the Present Disclosure (Example 5) and Comparative Example 6

During the second aging process, the taste quality of the mixed soybean pastes was to improve with an increase of the amino nitrogen content and a harmony of tastes. The fermented soybean paste of Example 5 according to the present disclosure and the test group of Comparative Example 6 aged at the room temperature were measured in regards to amino nitrogen content (mg %), pH value, and lightness (L). The measurements are presented in Table 2. Generally, a fermented soybean paste is considered to have a higher quality when it displays the higher amino nitrogen content and the higher lightness (L) in consideration of the long-term distribution and storage.

TABLE 2

Amino Nitrogen Content (mg %), pH, and Lightness (L) of Fermented soybean pastes of Example 5 and Comparative Example 6

| Div. | Amino nitrogen content (mg %) | pH | Lightness (L) |
|---|---|---|---|
| Comparative Example 6 | 741 | 5.09 | 39.7 |
| Example 5 | 707 | 5.12 | 43.9 |

The fermented soybean paste of Comparative Example 6 showed an increase in the amino nitrogen content, a decrease in the pH value, and the darker color, and gave off a stale taste and an unpleasant smell with the occurrence of browning. In contrast, the fermented soybean paste of Example 5 subjected to a second aging at low temperature had a decrease in the proteolysis rate, a more slight increase in the amino nitrogen content, and an increase in the pH value, and showed less browning. It is therefore considered that the second aging at low temperature is more favorable in the aspect of appearance and flavor.

Experimental Example 3: Sensory Evaluation on Fermented Soybean Paste of Example 5 and Korean Fermented Soybean Paste A sensory evaluation on the fermented soybean paste of Example 5 was performed in order to determine the difference in the sensory properties between the fermented soybean paste of the present disclosure and the Korean fermented soybean paste.

81 female homemakers 30 to 49 years old living in the Seoul/Kyeonggi-do districts participated in the experiment; that is, they cooked a soybean (doenjang) soup and a soybean (doenjang) stew with a portion of the same soybean paste and a same recipe and tasted them for sensory evaluation. The taste quality and the sensory profile were evaluated. In the evaluation, the individual soybean pastes were scored on a five-point scale in terms of the representative taste properties and emotional/image qualities of doenjang. The evaluation results are presented in Table 3.

TABLE 3

Sensory Evaluation on Fermented soybean paste of Example 5 and Korean Fermented soybean paste

| Div. | | Korean fermented soybean paste | Fermented soybean paste of Example 5 | p-value |
|---|---|---|---|---|
| Taste quality | Whole acceptability | 3.49 | 3.75 | 0.02 |
| | Color | 3.57 | 3.80 | 0.02 |
| | Flavor | 3.46 | 3.69 | 0.03 |
| | Taste | 3.49 | 3.75 | 0.02 |
| | Aftertaste | 3.31 | 3.55 | 0.05 |
| | Deep savor | 3.45 | 3.70 | 0.02 |
| | Saltiness | 3.23 | 3.27 | 0.73 |
| | Sweetness | 3.33 | 3.44 | 0.23 |
| | Umami | 3.33 | 3.67 | 0.00 |
| Emotional/image evaluation | Healthy | 3.21 | 3.38 | 0.18 |
| | Exclusive | 2.98 | 3.12 | 0.33 |
| | Deep-tasted | 2.97 | 3.34 | 0.01 |
| | Simple | 3.22 | 3.23 | 0.92 |
| | Strong-flavored | 2.94 | 3.52 | 0.00 |
| | Novel | 2.95 | 2.95 | 1.00 |
| | Reliable | 3.07 | 3.27 | 0.13 |
| | Fresh | 3.11 | 3.09 | 0.85 |
| | Artificial | 2.08 | 2.75 | 0.56 |
| | Traditional | 2.91 | 3.25 | 0.02 |
| | Elaborate | 3.14 | 3.33 | 0.15 |

The fermented soybean paste of the present disclosure in comparison to the traditional Korean fermented soybean paste was mostly highly evaluated with significance in the entire qualities including the whole acceptability. In particular, it was highly rated with significance in regards to the deep savor, flavor, or aftertaste quality characteristic to the fermented soybean paste (doenjang). It was also considered to have the higher emotional/image qualities relating to "deep-tasted, strong-flavored, or traditional" characteristics. In conclusion, the preparation method of the present disclosure may contribute to the efficiency of the preparation method for fermented soybean paste and the enhancement of the taste qualities of the traditional fermented soybean paste as well.

EXPLANATION OF SYMBOLS

S10: Mixing
S20: First aging
S30: Second aging

What is claimed is:

1. A method for preparing a fermented soybean paste that includes:
   (A) mixing a traditional Korean fermented soybean paste and a modified Korean fermented soybean paste to prepare a mixed fermented soybean paste;
   (B) conducting a first aging for the mixed fermented soybean paste at 20 to 30° C. for 60 to 90 days; and
   (C) conducting a second aging for the mixed fermented soybean paste after completion of the first aging at 10 to 15° C. for 60 days to 100 days,
   wherein the traditional Korean fermented soybean paste is prepared from a Korean-style meju soaked in brine, wherein the Korean style meju is prepared by crushing soybeans, shaping the crushed soybeans into a block and fermenting the shaped soybeans; and
   wherein the modified Korean fermented soybean paste is prepared from a modified meju soaked in brine or mixed with salt and water, and wherein the modified meju is prepared by fermenting soybeans with adding a fermentation starter, and wherein the fermented soybeans keep their shape.

2. The method as claimed in claim 1, wherein the traditional Korean fermented soybean paste is prepared from a Korean-style meju prepared by steaming and cooling down soybeans before crushing and shaping of the soybeans, and, adding *Aspergillus oryzae* to the crushed and shaped soybeans as a fermentation starter in an amount of 0.1 to 1.0 wt. % with respect to the weight of grains, and conducting the fermentation, wherein the shaping comprises shaping the soybeans into a rectangular block.

3. The method as claimed in claim 1, wherein the modified Korean fermented soybean paste is prepared from a modified meju prepared by steaming and cooling down soybeans, adding the fermentation starter in an amount of 0.1 to 2.0 wt. % with respect to the weight of grains, and conducting the fermentation.

4. The method as claimed in claim 1, wherein the fermentation starter is *Aspergillus oryzae*.

5. The method as claimed in claim 1, wherein the traditional Korean fermented soybean paste and the modified Korean fermented soybean paste are mixed at a mixing ratio of 0.8:1 to 4:1.

6. The method as claimed in claim 1, wherein the traditional Korean fermented soybean paste and the modified Korean fermented soybean paste are mixed at a mixing ratio of 1:1 to 3:1.

* * * * *